April 3, 1928.
W. T. FRAZIER
1,665,161
WHEEL ALIGNING TOOL
Filed Nov. 30, 1925
2 Sheets-Sheet 1
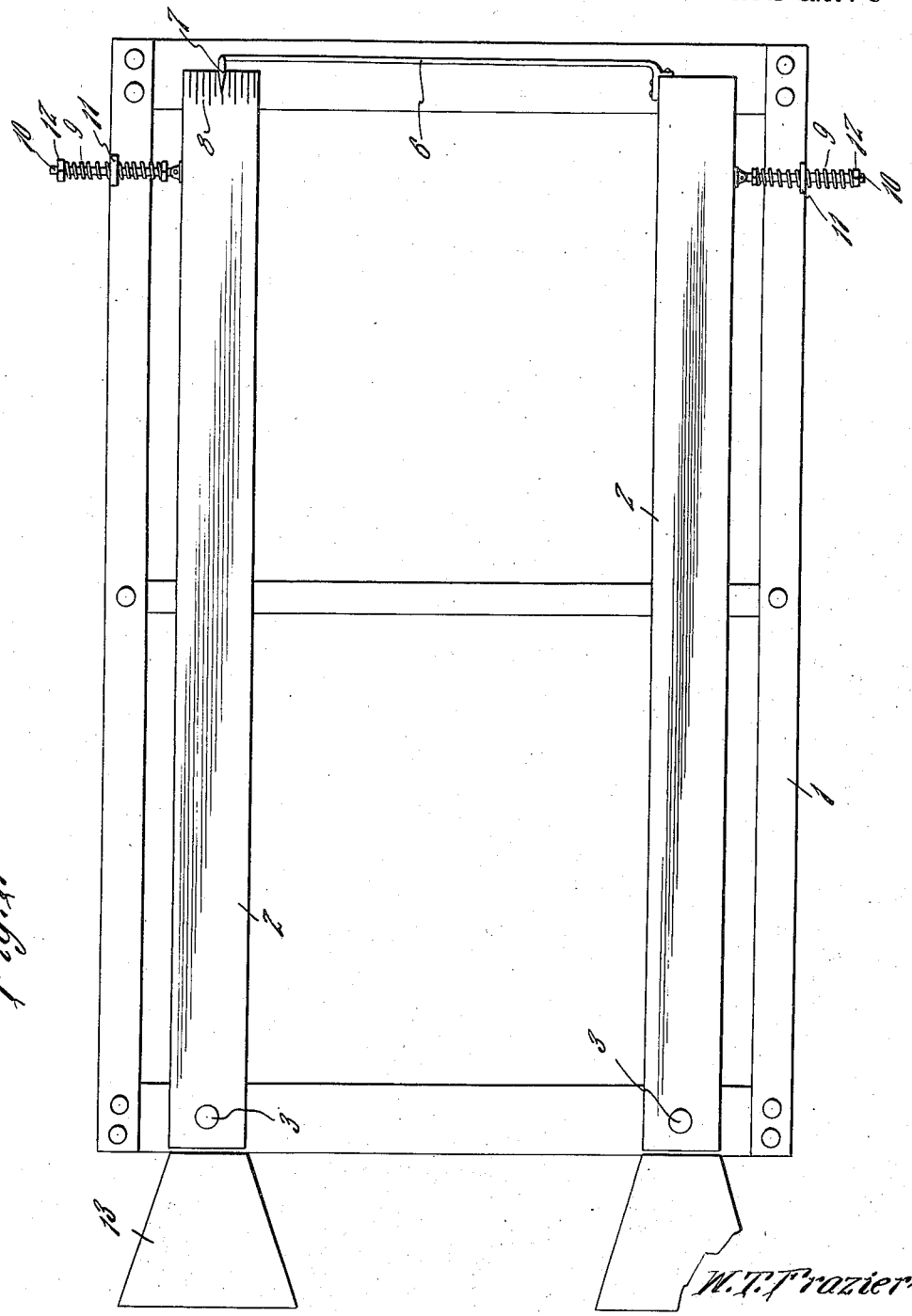

April 3, 1928.
W. T. FRAZIER
1,665,161
WHEEL ALIGNING TOOL
Filed Nov. 30, 1925
2 Sheets-Sheet 2
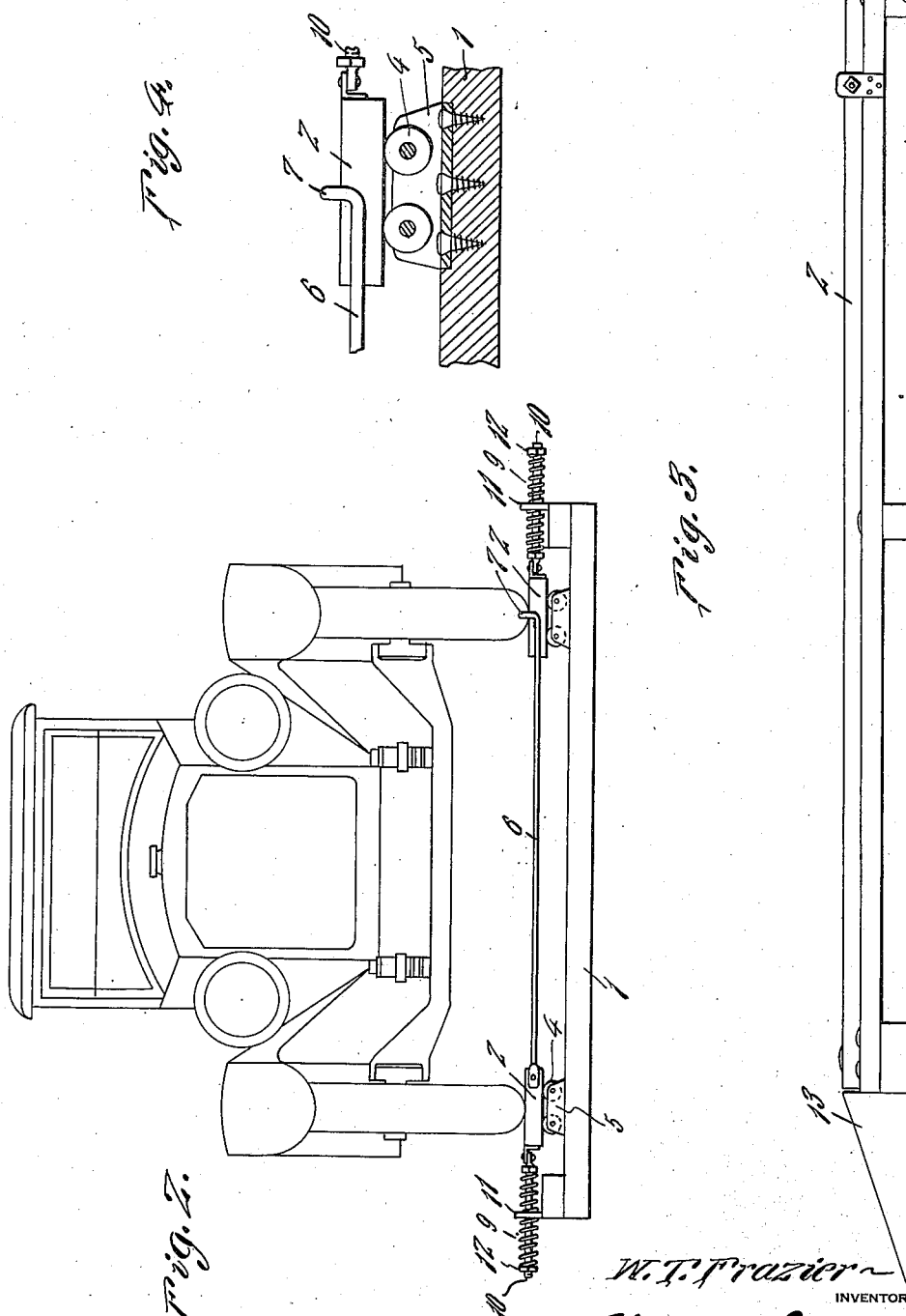
W. T. Frazier
INVENTOR
BY Victor J. Evans
ATTORNEY Patented Apr. 3, 1928.

1,665,161

UNITED STATES PATENT OFFICE.

WILLIAM T. FRAZIER, OF CHASE CITY, VIRGINIA.

WHEEL-ALIGNING TOOL.

Application filed November 30, 1925. Serial No. 72,329. REISSUED

This invention relates to a device for facilitating the aligning of wheels of motor vehicles and the like, the general object of the invention being to provide means, movable with the wheels, when the same are out of alignment, with indicator means for indicating the amount of movement of such means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the improved device.

Figure 2 is a front view showing the same in use.

Figure 3 is a side view.

Figure 4 is a detail sectional view.

In these views, 1 indicates a frame which is adapted to be placed on the ground or otherwise supported where an automobile or other vehicle can be driven over the same. A pair of track members 2 is carried by the frame, each member having one end pivotally connected with an end piece of the frame, as shown at 3. The track members extend parallel with the side pieces of the frame and their central parts rest upon the rollers 4 which are carried by the brackets 5 secured to portions of the frame. The other ends of the track members are free and a rod 6 is fastened to the free end of one member and has a finger 7 on its other end which cooperates with the scale 8 on the free end of the other track member so that the relative movements of the track members can be determined. Each track member is held in a neutral position by means of a pair of springs 9 placed on a rod 10 fastened to the member, adjacent its free end and passing through a projection 11 on the frame, the projection separating the springs, nuts 12 being provided for enabling the tension of the springs to be adjusted. Inclined runways 13 are arranged at the pivoted ends of the track members for enabling a vehicle to be run upon said members.

From the foregoing, it will be seen that when a vehicle is driven upon the device, the front wheels engaging the track members, will move such members, if the wheels are out of alignment, as the frictional engagement of the wheels with the members will cause the members to move upon the pivots and upon the rollers. The finger and scale will indicate the amount of such movement, so that one can tell just how much the wheels are out of alignment. When the vehicle is removed from the device, the springs 9 will move the track members back to their neutral position.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described, comprising a frame, a pair of track members each having one end pivoted thereto and the other end free so that said members will move with the wheels of a vehicle engaging the members, if said wheels are out of alignment one track member having a scale on its free end, means for normally holding the track members in parallel relation and an indicator connected with the other member and cooperating with said scale for indicating the amount of movement of the members.

2. An apparatus of the class described, comprising a frame, a pair of track members each having one end pivoted thereto and the other end free so that said members will move with the wheels of a vehicle engaging the members, if said wheels are out of alignment one track member having a scale on its free end, spring means for normally holding the track members in parallel relation and an indicator connected with the other member and cooperating with said scale for indicating the amount of movement of the members.

3. An apparatus of the class described, comprising a frame, a pair of track members carried thereby and each having one end pivoted thereto, anti-friction means for movably supporting the track members one member having a scale thereon, spring means for normally holding the track members in parallel relation and an indicator connected with the other member and cooperating with said scale for indicating the amount of movement of the members.

4. A wheel alignment indicator comprising an elongated track member pivotally supported adjacent one end to turn horizontally under the thrust of a misaligned wheel rolling therealong, and an antifriction support for the free end of the member, there being provision at said end for indicating relative movement thereof and including a scale and an index, one of which is carried by said member.

In testimony whereof I affix my signature.

WILLIAM T. FRAZIER.